Figure 1:
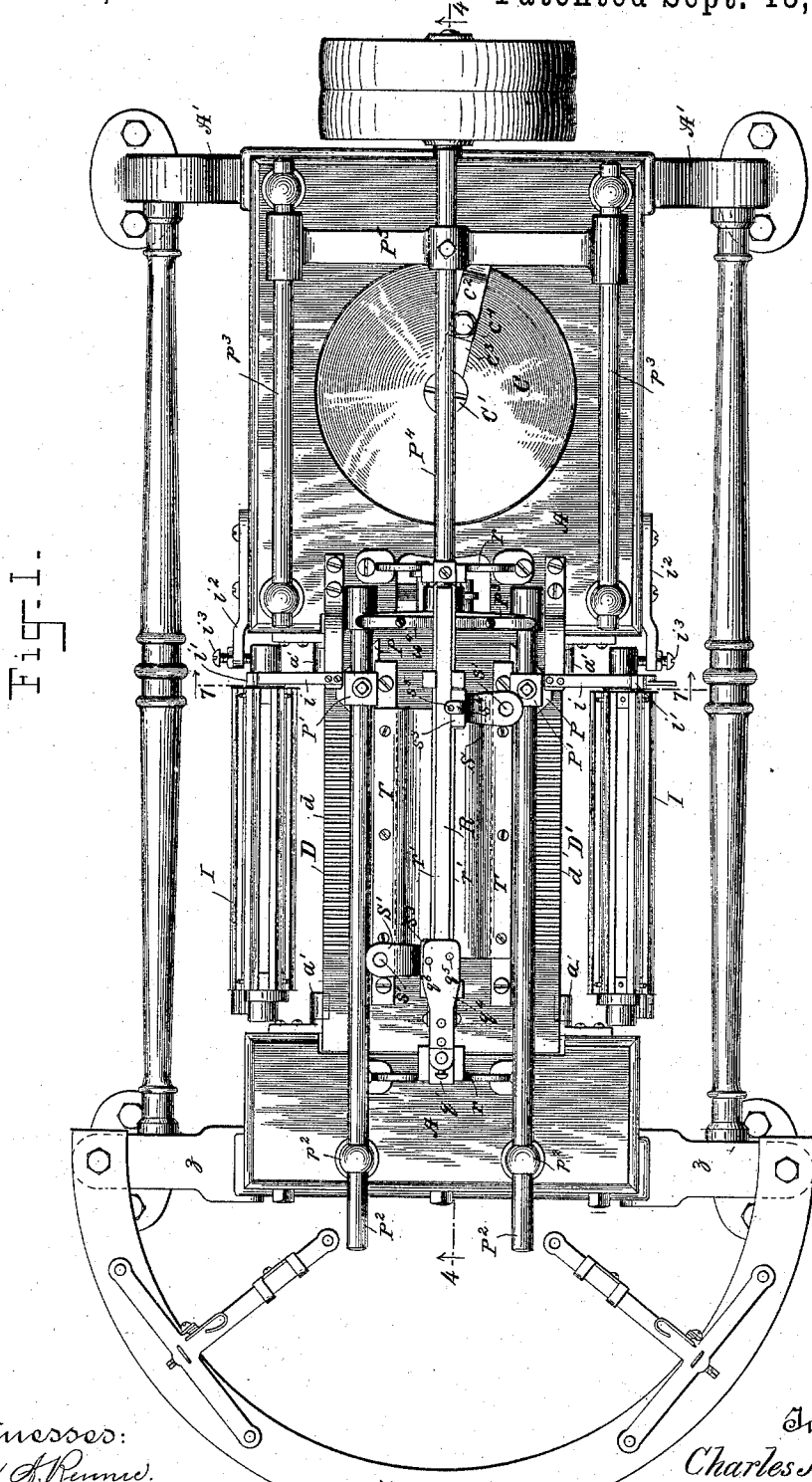

(No Model.)

9 Sheets—Sheet 1.

C. J. APPLETON.
KNITTING MACHINE.

No. 482,608. Patented Sept. 13, 1892.

Witnesses:
John J. Renno.
John F. Nelson.

Inventor.
Charles J. Appleton.
By Wm H. Appleton
Attorney.

(No Model.)  
9 Sheets—Sheet 2.

C. J. APPLETON.
KNITTING MACHINE.

No. 482,608.  Patented Sept. 13, 1892.

Witnesses  
John F. Nelson.  
Rob. W. Waterbury.

Inventor  
Charles J. Appleton.  
By Wm H. Appleton  
Attorney (No Model.) 9 Sheets—Sheet 3.
C. J. APPLETON.
KNITTING MACHINE.

No. 482,608. Patented Sept. 13, 1892.

Witnesses.
John F. Nelson.
Robt. W. Waterbury.

Inventor
Charles J. Appleton.
By Wm. J. Appleton
Attorney.

(No Model.) 9 Sheets—Sheet 4.

C. J. APPLETON.
KNITTING MACHINE.

No. 482,608. Patented Sept. 13, 1892.

Witnesses
John F. Nelson
Robt. W. Waterbury

Inventor
Charles J. Appleton
By Wm. H. Appleton
Attorney (No Model.)  
9 Sheets—Sheet 5.

C. J. APPLETON.
KNITTING MACHINE.

No. 482,608.  
Patented Sept. 13, 1892.

Witnesses:
John F. Rennie
John F. Nelson

Inventor:
Charles J. Appleton
By Wm. H. Appleton
Attorney.

(No Model.) 9 Sheets—Sheet 6.

C. J. APPLETON.
KNITTING MACHINE.

No. 482,608. Patented Sept. 13, 1892.

Witnesses:
John A. Rennie
John F. Nelson

Inventor:
Charles J. Appleton.
By Wm. H. Appleton
Attorney.

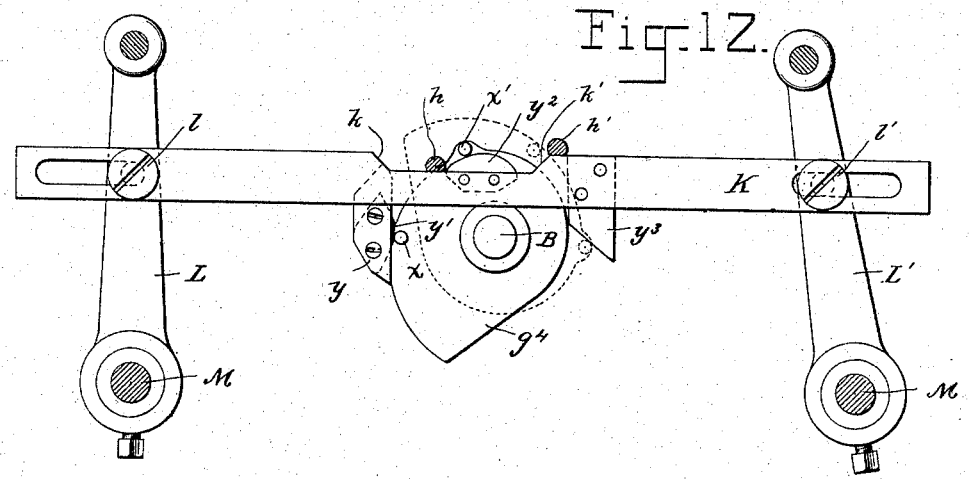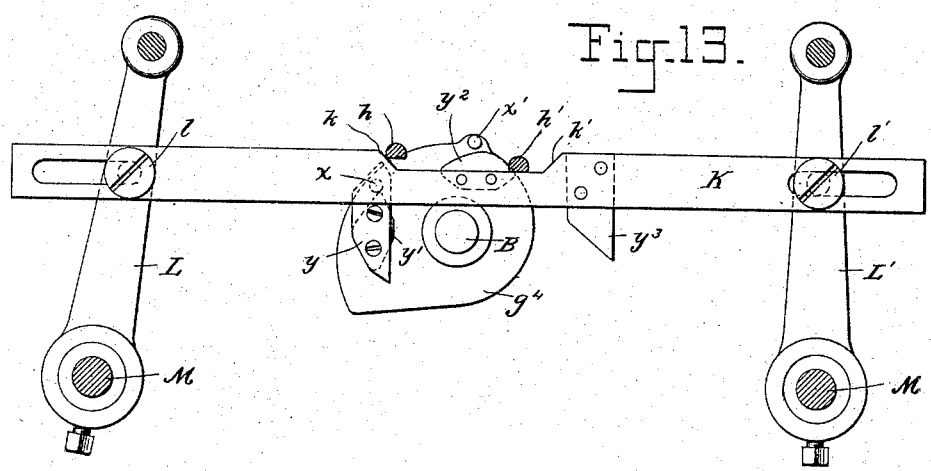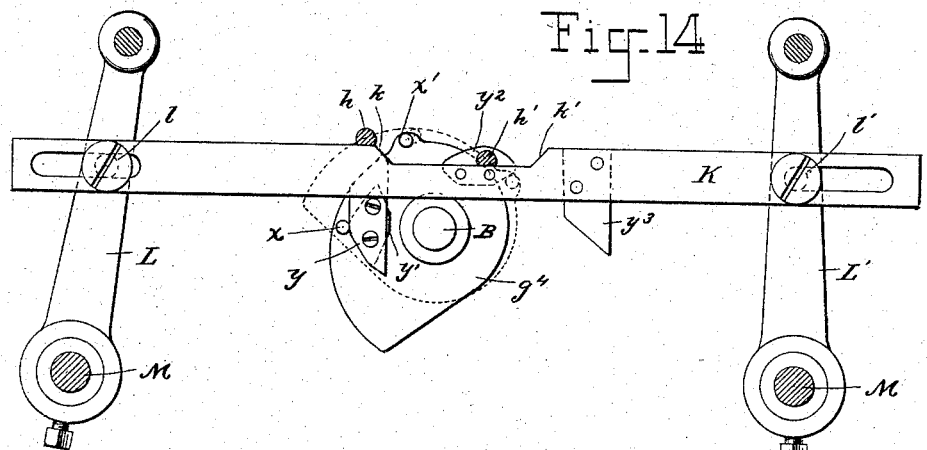

(No Model.)
9 Sheets—Sheet 8.
C. J. APPLETON.
KNITTING MACHINE.
No. 482,608. Patented Sept. 13, 1892.
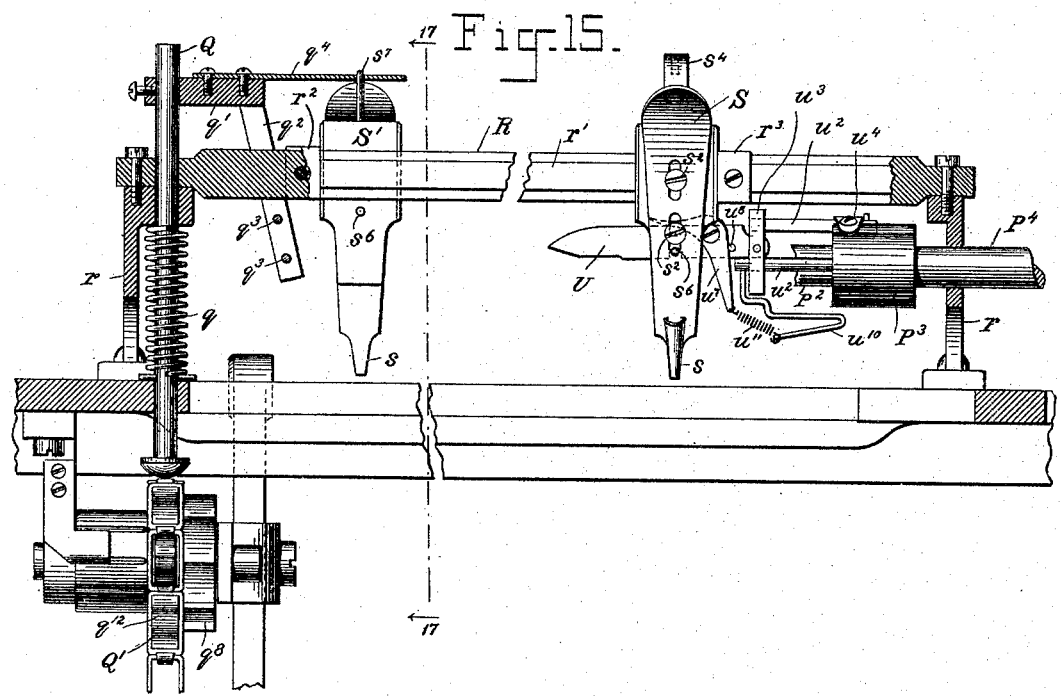
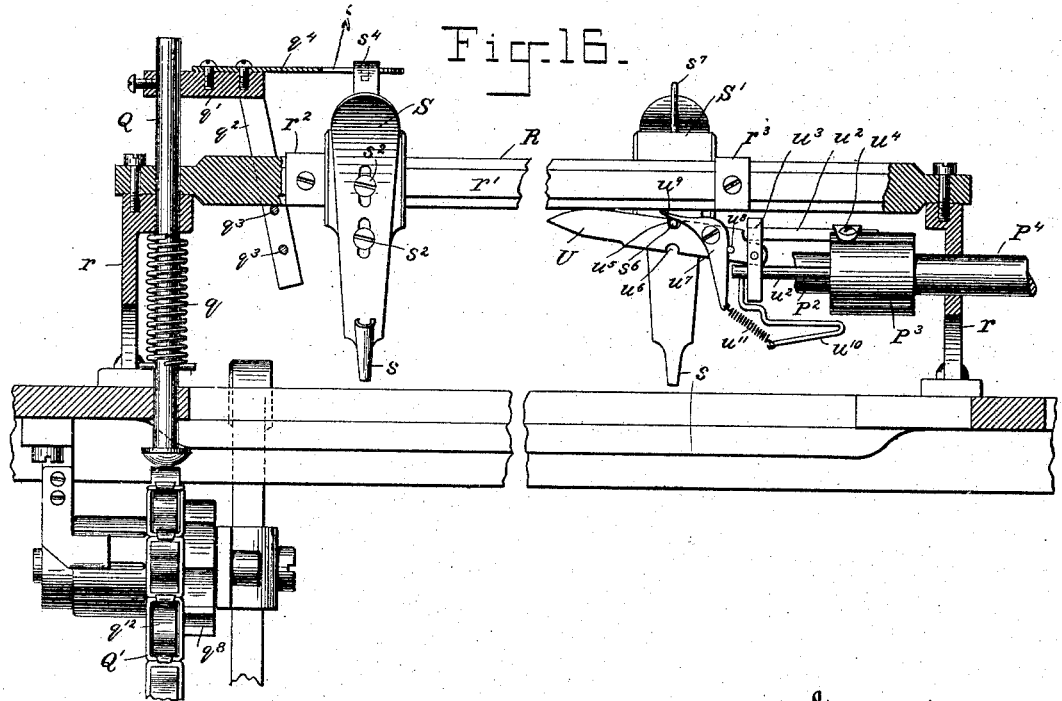
Witnesses:
John A. Rennie
John F. Nelson
Inventor:
Charles J. Appleton
By Wm. H. Appleton
Attorney.

(No Model.)

9 Sheets—Sheet 9.

C. J. APPLETON.
KNITTING MACHINE.

No. 482,608. Patented Sept. 13, 1892.

Witnesses:
John A. Rennie.
John F. Nelson.

Inventor.
Charles J. Appleton.
By Wm. H. Appleton,
Attorney.

UNITED STATES PATENT OFFICE.

CHARLES JAMES APPLETON, OF NEW YORK, N. Y., ASSIGNOR OF TWO-THIRDS TO HUGO S. MACK AND ELBERT A. WHITTELSEY.

KNITTING-MACHINE.

SPECIFICATION forming part of Letters Patent No. 482,608, dated September 13, 1892.

Application filed December 26, 1890. Renewed August 18, 1892. Serial No. 443,364. (No model.)

*To all whom it may concern:*

Be it known that I, CHARLES JAMES APPLETON, a citizen of the United States, and a resident of New York, county of New York, and State of New York, have invented certain new and useful Improvements in Knitting-Machines, of which the following is a specification.

My invention relates to what are known in the art as "straight-knitting machines," or those in which the needles are arranged in straight rows, and especially to that class of such machines which are designed for knitting tubular and other fabrics, my objects being the production of a knitting machine of this class which shall be simple in construction, shall be adapted to the production of a greater variety and finer grade of work than has been possible with the machines heretofore in use, and which shall at the same time be capable of knitting an entire stocking or other fashioned article automatically, and also capable of automatically controlling the knitting of the article with stripes or courses of different colors or kind of yarn.

To this end my invention consists in the mechanism for accomplishing these results, the nature and distinguishing characteristics of which mechanism will be best understood by reference to the accompanying drawings, in which—

Figure 2:
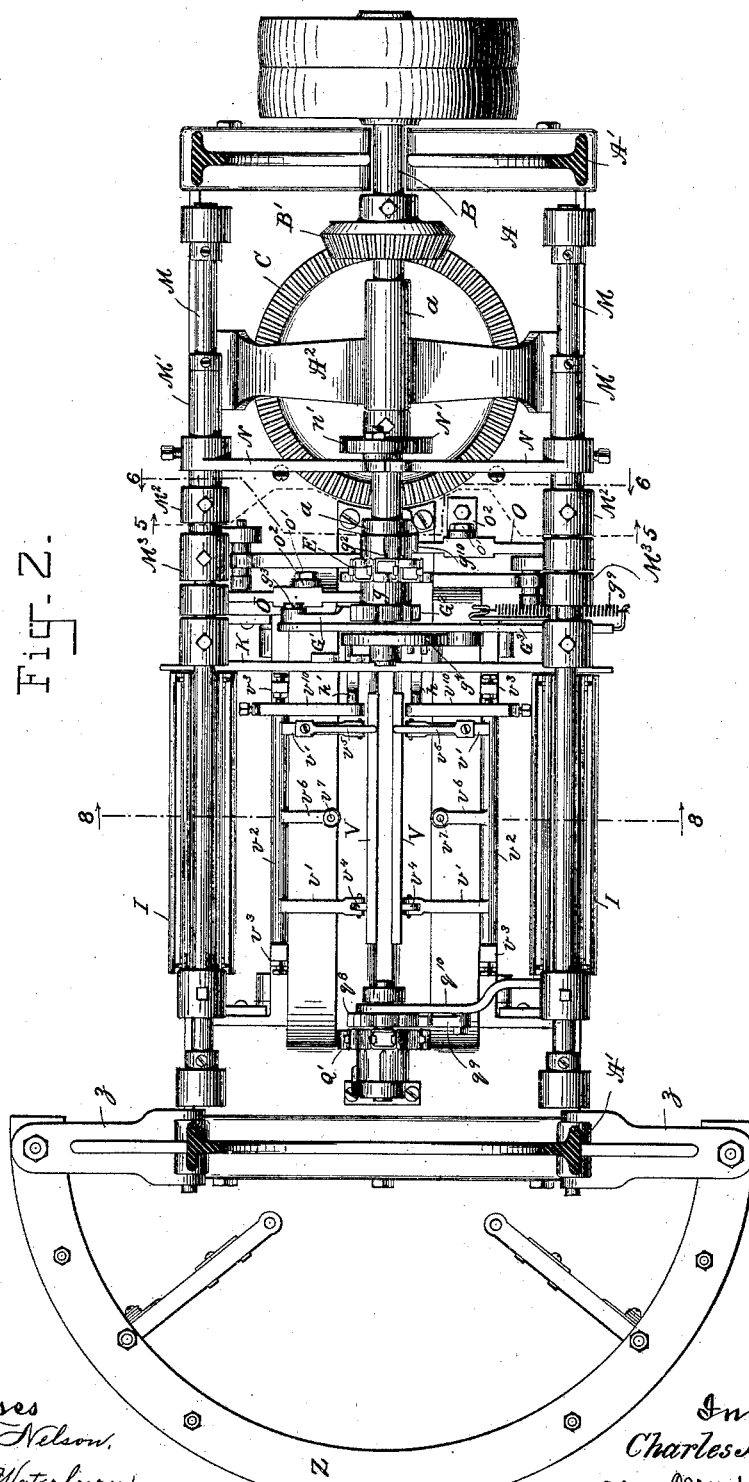
Figure 3:
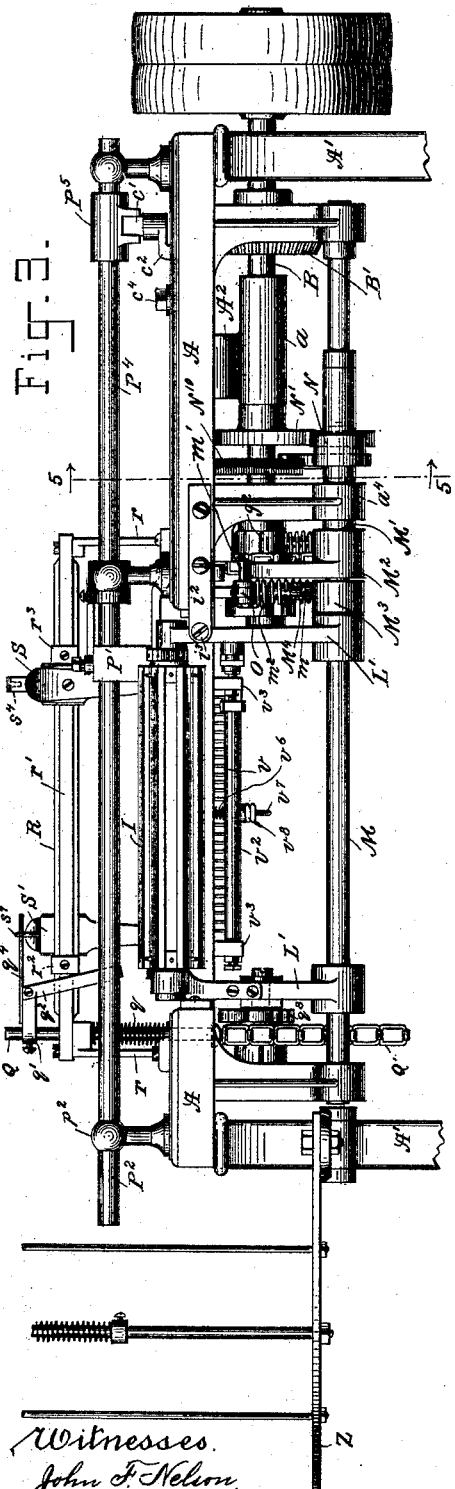
Figure 4:
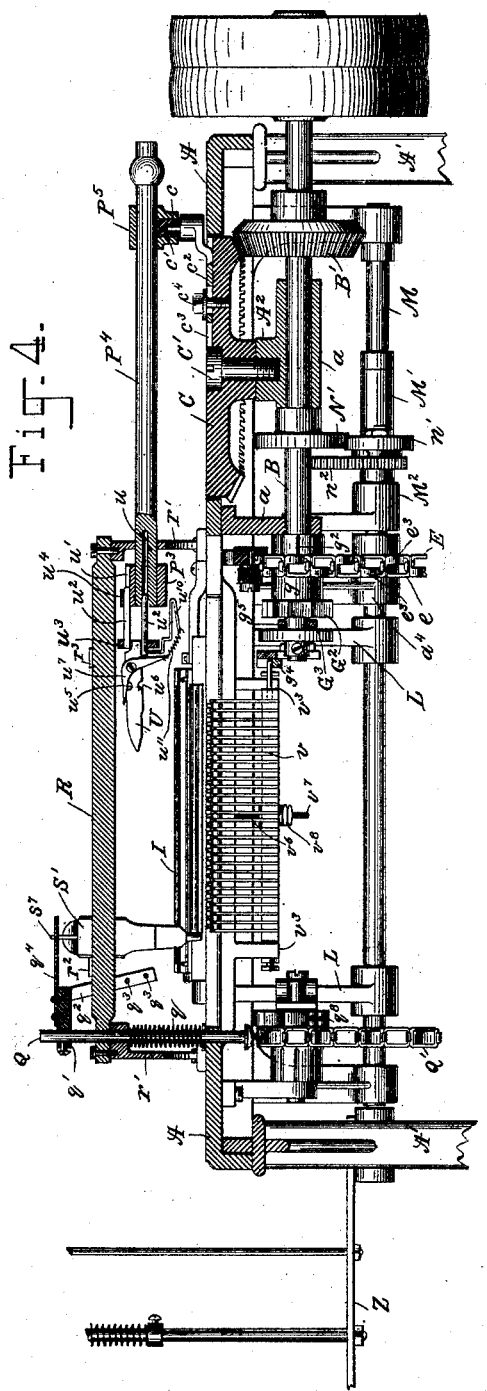
Figure 5:
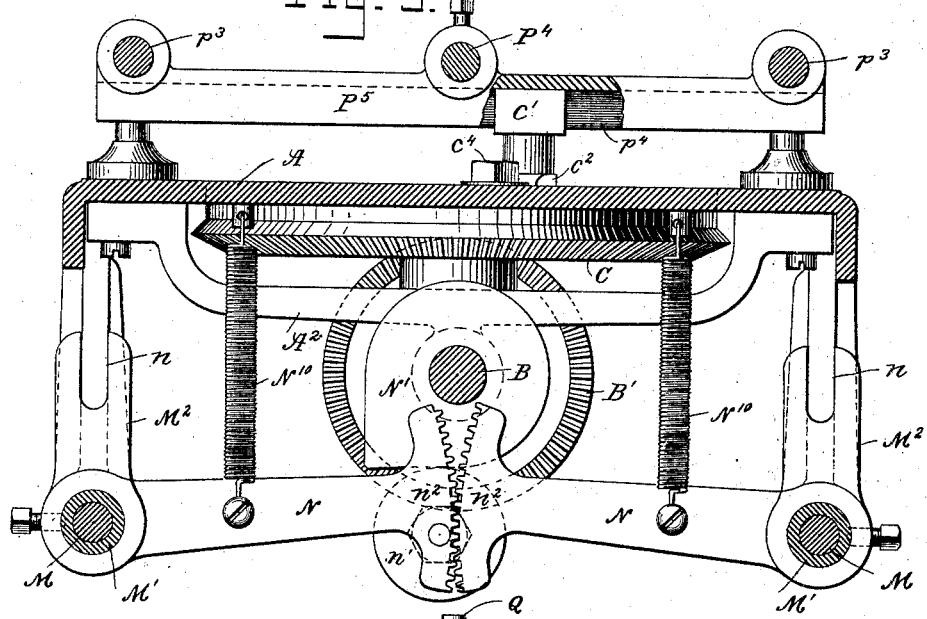
Figure 6:
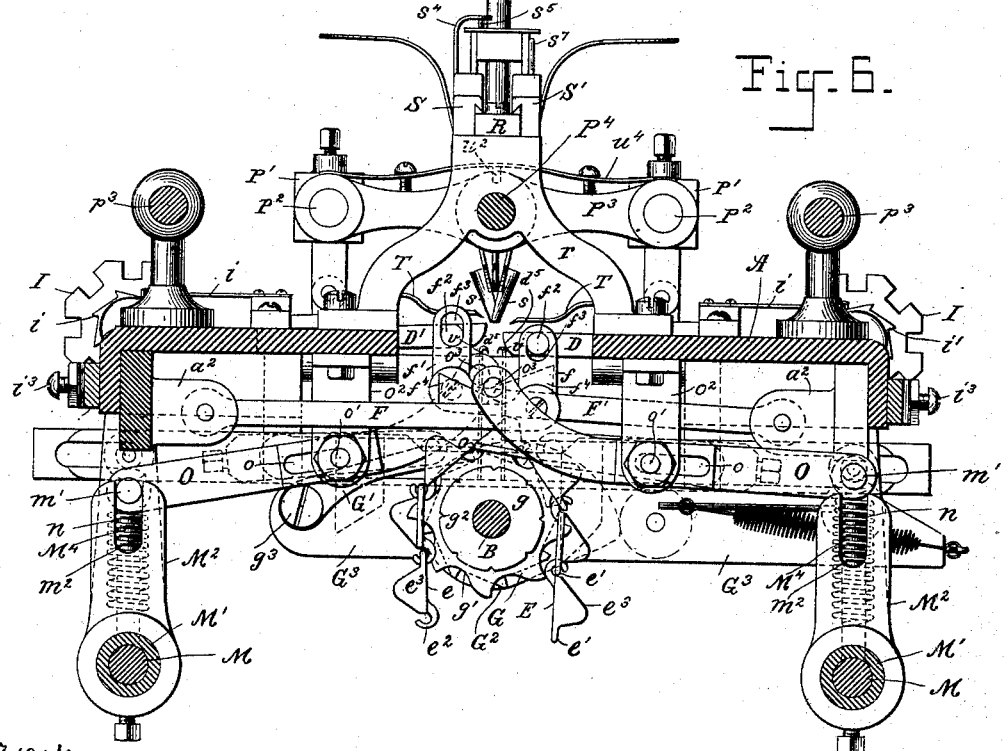
Figure 7:
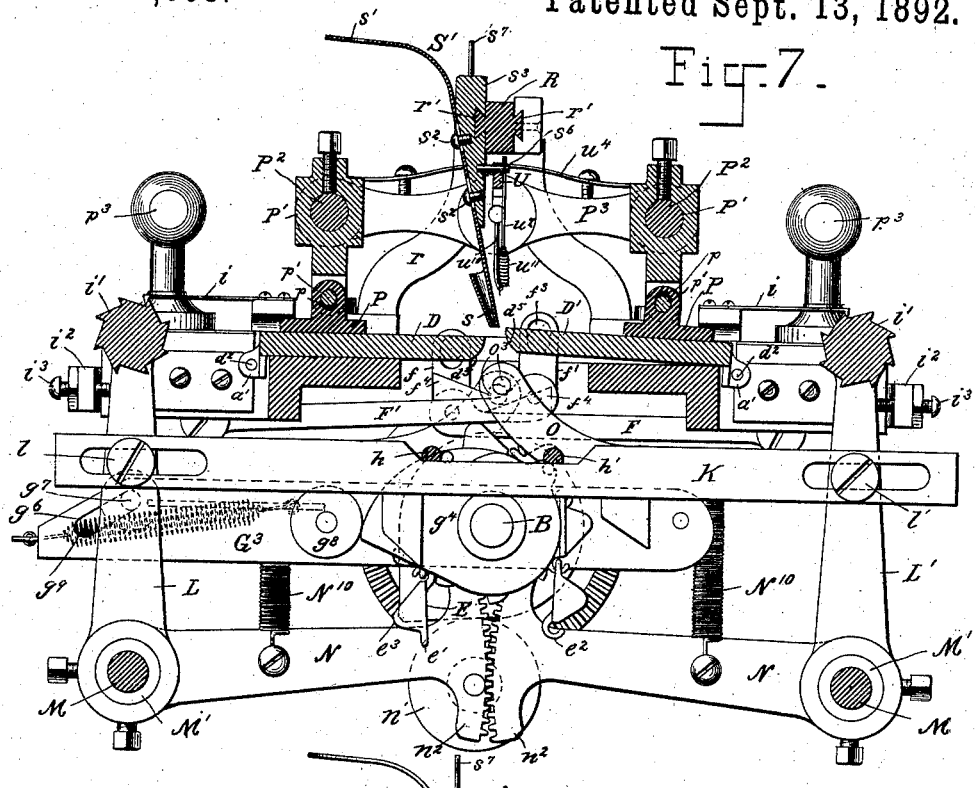
Figure 8:
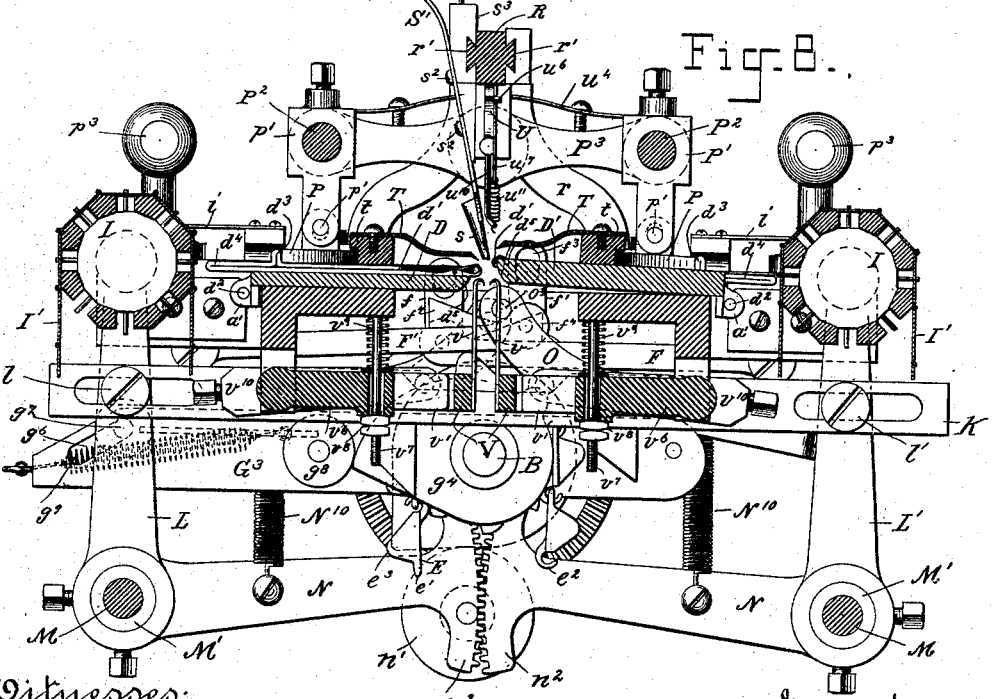
Figure 9:
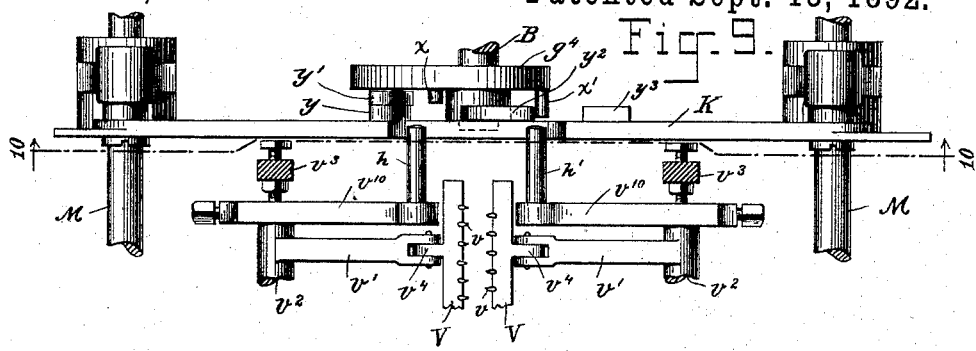
Figure 10:
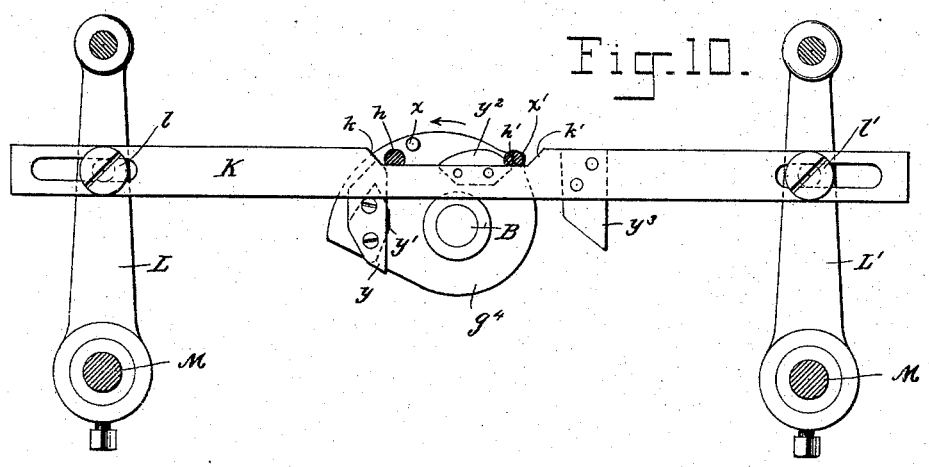
Figure 11:
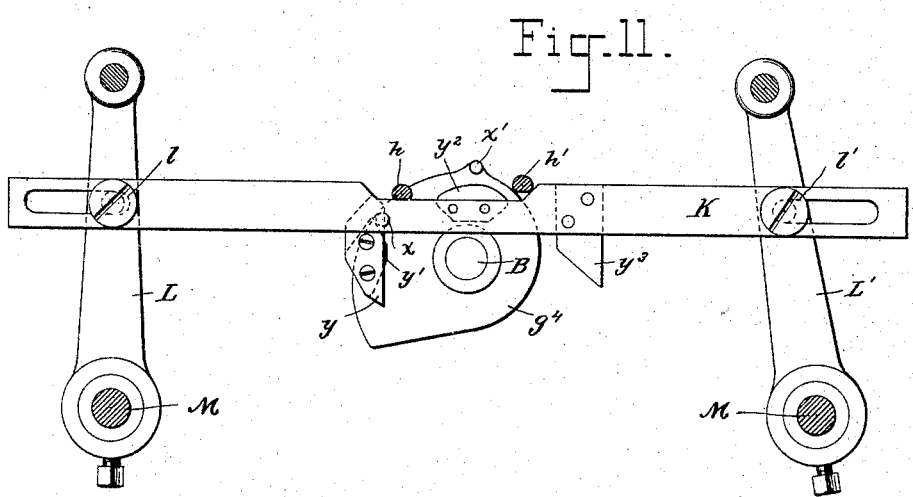
Figure 17:
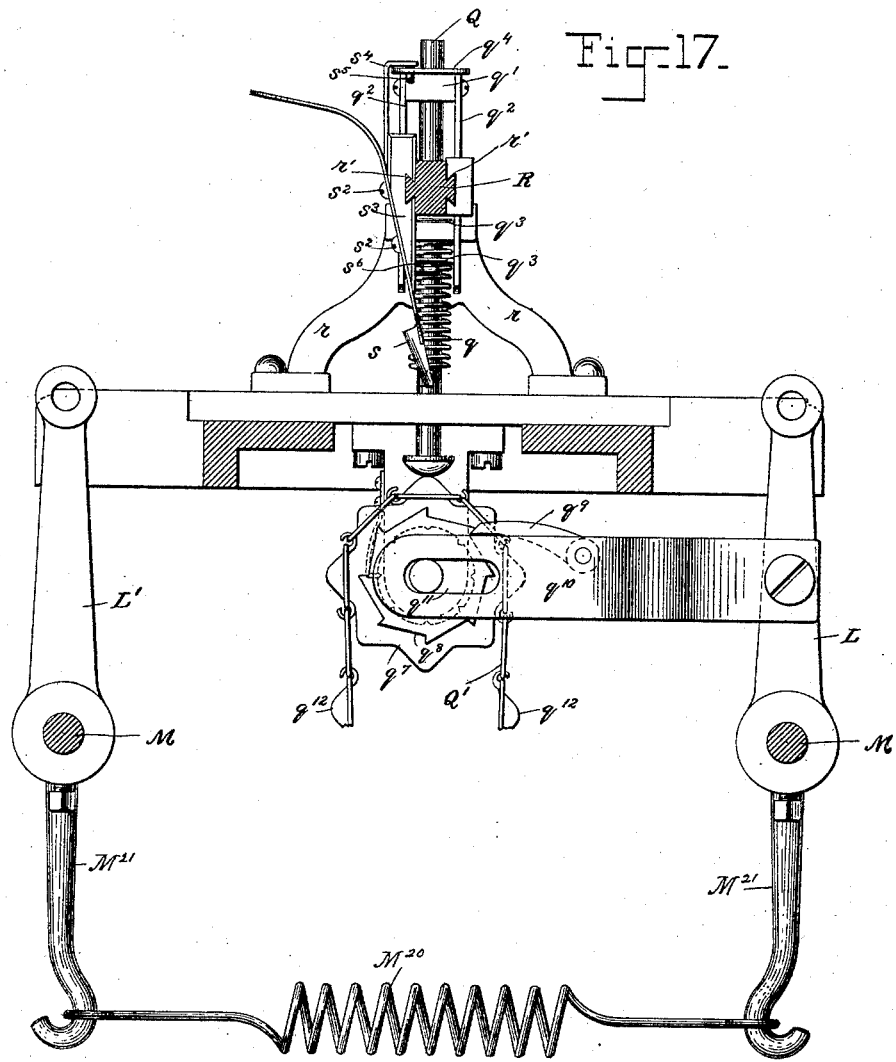

Figure 1 is a plan view of a complete machine embodying my invention. Fig. 2 is an under plan view of the same, the supporting-legs being shown in section. Fig. 3 is a side elevation of the right-hand side of the machine, as shown in Fig. 1, the legs being broken away. Fig. 4 is a longitudinal section of the same, taken on the line and looking in the direction of the arrows 4 4 in Fig. 1, some of the parts, however, being shown in elevation and others omitted. Fig. 5 is a transverse section taken on the line and looking in the direction of the arrows 5 5 of Fig. 2. Fig. 6 is a transverse section taken on the line and looking in the direction of the arrows 6 6 of Fig. 2. Fig. 7 is a section taken on the line and looking in the direction of the arrows 7 7 of Fig. 1, but with the yarn-guide on the left in the line of section. Fig. 8 is a section on the line and looking in the direction of arrows 8 8 of Fig. 2. Fig. 9 is a detail plan of the mechanism for operating the hooks for holding down the fabrics. Fig. 10 is a section on the line and looking in the direction of arrows 10 10 of Fig. 9. Figs. 11 to 14, inclusive, are views similar to that in Fig. 10, but showing the parts of the said hook-operating mechanism in the different and successive positions occupied by it during its operation. Figs. 15 and 16 are detail side elevations, partly in section, of the mechanism for operating the yarn-guides, the two figures showing the same parts in two different operative positions; and Fig. 17 is a section on the line and looking in the direction of arrows 17 17 of Fig. 15, except that the yarn-guide which appears in said Fig. 17 is the one which appears at the right of Fig. 15. Of the figures thus described Figs. 1 to 4, inclusive, are drawn on substantially the same scale, while the remaining figures, 5 to 17, inclusive, are on enlarged but substantially uniform scale.

A represents the base-plate, which is or may be supported upon a suitable framework or legs, as shown, for instance, at A' in Figs. 2, 3, and 4, and B represents the driving-shaft by means of which the various parts of the machine are operated. This shaft is mounted in suitable bearings $a\,a$ under the base-plate, one of which bearings is formed in a girth $A^2$, which is shown most clearly in Fig. 5, the said shaft being provided with fast and loose pulleys, and with a bevel-gear B', which meshes with and rotates the bevel-gear C, of twice its diameter, carried by a stud C', mounted in the girth $A^2$, the object and purpose of which last-mentioned gear will presently appear.

D D' indicate the needle-bars, which are provided with the usual grooves $d$ for the reception of the needles $d'$, that are fitted to reciprocate freely therein. These needle-bars are normally arranged in substantially the same plane, in a recess or rectangular opening in the base-plate, and are hinged at their rear edges by means of journals $d^2\,d^2$, which enter bearings formed in the lugs $a'\,a'$, (see Figs. 1, 7, and 8,) so as to be capable of an upwardly and downwardly swinging movement therein; and in the operation of the machine each of these bars will be swung upward slightly from its normal position during or before the time that the needles carried thereby are being reciprocated in order that they may be carried above the other bar while being thus operated, as shown in Figs. 7 and 8. In Fig. 8 a complete needle is shown in a groove of one bar only, because the line of section of said figure is taken through a groove of that bar and through the space between two grooves of the other bar.

To effect the upwardly swinging movement of the needle-bars automatically, the pattern-chain E is employed, which acts against the under side of the levers F F', pivoted at their rear ends to lugs $a^2$ $a^2$ of the frame, and at their outer free ends are connected by means of links $f f'$ to the inner edges of the needle-bars, each of which is provided at one end, near its edge, with a pin $f^2$, which enters a short vertical slot $f^3$ in its respective link, the object of this pin-and-slot connection being to permit a greater rise of the ends of the levers than is communicated to the needle-bars, in order to give to the levers O, which are operated by levers F F', sufficient movement to insure the proper engagement of the lug and recess $m'$ $n$, all as will be more fully hereinafter described. The lever F is thus connected to the needle-bar D and the lever F' to the bar D'.

The pattern-chain E may be of any of the well-known forms. I prefer, however, to employ that form illustrated in Figs. 4 and 6, in which the chain is composed of a series of links $e$, having a rod $e'$ at one end and a hook $e^2$ at the other end, by means of which the several links are united, and each link having a cam $e^3$ on one side or the other to engage either lever F or F'. The chain made up as illustrated will cause the alternate lifting of levers F and F' by the engagement therewith of the cams $e^3$, as for knitting tubular articles, while for knitting a flat web the chain used would consist of links having their cams all on one side for lifting but one lever and needle-bar.

G indicates the drum upon which the pattern-chain is mounted and over which it is moved progressively, it being constructed in the form of a disk loosely mounted on shaft B and having notches or recesses $g'$ (see Fig. 6) to receive the cross-rods $e'$ and hooks $e^2$ of the pattern-chain, the engagement of the teeth between the notches of the drum with said hooks causing when the drum is rotated the movement or feed of the pattern-chain and the consequent lifting of either needle-bar according to which of the levers F F' is engaged by a cam $e^3$. At one end of the sleeve $g$, by which the drum is loosely mounted on shaft B, is formed a series of peripheral grooves $g^2$, adapted to be engaged by any well-known form of spring-detent, as indicated at $g^{10}$ in Fig. 2, said grooves corresponding with the number of teeth or recesses in the drum, whereby said drum may be held in the position in which it is left by the pawl, presently described, and at the other end of the sleeve $g$ is a ratchet $G^2$, adapted to be engaged by the pawl $G'$, (see Fig. 6,) pivoted at $g^3$ to one end of a sliding bar $G^3$. This sliding bar is located between the ratchet $G^2$ and the cam $g^4$, carried by the end of shaft B, (see Figs. 2 and 4,) and is provided with a slot $g^5$, (see Fig. 4,) through which shaft B passes and which is of sufficient length to allow of the bar being freely reciprocated the necessary distance and guided on said shaft. This bar $G^3$ (see particularly Figs. 6, 7, and 8) has an inclined slot $g^6$ at the end opposite the pawl, and a pin $g^7$, carried by a fixed part of the frame, (not shown,) enters said slot, whereby the said bar during its reciprocations is caused to work or swing on the shaft B as a fulcrum, and thereby cause the pawl $G'$ to follow to a certain extent the direction of movement of the ratchet-tooth engaged by it. A friction-roller $g^8$, carried by the bar, is engaged by the cam $g^4$, and a spring $g^9$, connected at one end to the bar and at the other to a fixed part of the frame, keeps said roller in contact with the cam.

The needles $d'$ are of the ordinary latch form; but I construct their shanks by bending the wire out of which they are formed back upon itself, as shown in Fig. 8, forming the butts $d^3$ at some distance from their rear ends, thus leaving tails $d^4$ projecting some distance beyond said butts. These needles may be reciprocated in any of the well-known ways common to straight knitting-machines; but I prefer to advance or thrust them forward by means of a Jacquard mechanism and to retract them by means of cams, which are traversed back and forth across their shanks, as I am thereby the better enabled to control their movements during the knitting operations.

The Jacquard mechanism employed by me for advancing the needles is shown clearly in Figs. 1 to 8, inclusive, of the drawings, I I being grooved octagonal prisms, I' I' the pattern-cards upon them, and L L' the arms for supporting said prisms from the rock-shafts M M, which in turn are mounted in suitable bearings in the frame A'. The parts as thus described are of well-known forms, and the prisms are rotated intermittently to feed the pattern-cards forward by the ordinary stationary pawls $i$ $i$ engaging the ratchets $i'$ $i'$, secured to their ends.

At $i^2$ $i^2$ in Figs. 1 and 7 are shown brackets secured to the frame and having stop-screws $i^3$ $i^3$, which are in the path of the backward movement of the upper ends of arms L L', whereby the outward movement of the prisms may be adjustably limited, if desired. These prisms, and with them the pattern-cards, are not vibrated continuously, however, but instead thereof are so moved only when the needle-bar carrying the particular row of needles that is to be operated is swung upward, at other times such prisms and pattern-cards remaining stationary. In order, therefore, to thus move them in unison with the needle-bars I provide each of the rock-shafts M M with a sleeve M', having at one end an upwardly-projecting arm $M^2$, provided with a notch or recess $n$ in its upper end, and said sleeve having near its other end a laterally-projecting arm N, (see Figs. 5, 7, and 8,) provided with a segment-rack $n^2$ at its outer end. The racks of the two arms N mesh with each other and one of said arms carries a friction-roll $n'$, which is kept in engagement with a cam $N'$, fast on the driving-shaft B, by means of springs $N^{10}$, secured to the arms N and the under side of the frame. The two sleeves and their arms $M^2$ are by this means oscillated continuously and in unison, and the means whereby either sleeve is locked to the rock-shaft, on which it is loosely mounted, at the desired time in order to operate the jacquard and the needles of that bar that is raised by the pattern-chain, is as follows: Secured to each rock-shaft M adjacent to the arm $M^2$, by a screw or otherwise, is an arm $M^3$, in a socket $m$ of which is fitted to slide a rod or bar $M^4$, provided on the side next to the arm $M^2$ with a projection or lug $m'$ of such dimensions in cross-section as to fit the notch or recess $n$ in the upper end of arm $M^2$. The position of this projection is normally above and out of the path of the arm $M^2$ as the same is vibrated, it being held in that position by a spring $m^2$, coiled around the socket $m$ of the arm $M^3$ and confined between a shoulder formed thereon and the end of the lever O, which is pivoted to the upper end of rod $M^4$, as shown. The depression of this rod so as to bring its lug into the recess $n$ of arm $M^2$, and so cause the oscillations of the latter to be communicated to the rock-shaft and Jacquard prisms, may be effected in various ways. I prefer, however, to employ a sliding lever O, which, as above stated, is pivoted or jointed to the upper end of rod $M^4$, and is provided near its center with a slot $o$, which receives and permits the lever to move upon a fulcrum-pin $o'$, projecting from the side of the hanger $o^2$ depending from the under side of the base-plate. This lever is provided at its inner end with a stud or pin $o^3$, which rests upon the upper side of a lug $f^4$, which is carried by lever F or $F'$ and has an inclined top. There are two of these levers O, one for each Jacquard mechanism, and the stud $o^3$ of each lever O rests on the inclined lug of its respective lever F or $F'$ which is pivoted to the other side of the machine, for, as shown, the two levers F $F'$ pass each other and each serves to lift the needle-bar on the side opposite to that of its pivot. The direction of inclination of the lug $f^4$ is downward from the fulcrum of the lever O, whose stud $o^3$ is in engagement with it. The object of this is to prevent the disengagement of the lug $m'$ from the recess $n$ as the arm $M^2$ oscillates inward and causes lever O to slide. When the lever F or $F'$ is lifted by one of its appropriate cams of the pattern-chain, it lifts the inner end of lever O, and consequently causes a depression of the outer end of the latter and the engagement of the lug $m'$ with the recess $n$ and the operation of the Jacquard prism on that side of the machine, and owing to the arc of travel of recess $n$ it is necessary to provide for the retention within it of the lug $m'$. The inclined tops of the lugs $f^4$ serve this purpose. The movement of the rock-shaft M when the sleeve $M'$ is locked to it by the mechanism just described causes the prism I to be carried back and forth toward and away from the tails $d^4$ of the needles, the forward reciprocation thereof forcing the pattern-cards $I'$ against the ends of such tails and advancing the needles to receive the yarn in the operation of knitting, the number of and the particular needles thus advanced at each forward movement of the pattern-cards depending upon the number and arrangement of the perforations in the latter. The opposite or backward reciprocation of said prism through the operation of the spring $N^{10}$ upon the arm N of the sleeve $M'$ causes its own rotation by the engagement of the pawl $i$ with the teeth of the ratchet $i'$ secured to its end. These operations continue as long as the needle-bar remains in an elevated position, but cease the moment that it is depressed, as the rock-shaft M is thereby unlocked from the sleeve $M'$ by the removal of the lug $m'$ from the notch or recess $n$ in the upper end of the arm $M^2$ consequent upon the depression of the inner ends of the levers F or $F'$ and of levers O by the action of spring $m^2$ upward at the outer end of the latter. It will thus be seen that each of the Jacquard mechanisms is under the control of the lever which raises its corresponding needle-bar and is brought into or carried out of operation as such needle-bar is raised or lowered.

In order to suspend the movement of the rock-shaft M and the Jacquard mechanism carried thereby when the former is thrown out of engagement with the sleeve $M'$, I may employ any suitable device, as a spring $M^{20}$, connecting the ends of two arms $M^{21}$, projecting downward from the two rock-shafts, as indicated in Fig. 17, and in some cases I find it convenient to support such rock-shaft and the sleeve $M'$ carried thereby at a point near the arm $M^2$ of the latter by a bearing formed in the lower end of the hanger $a^4$. (See Fig. 3.)

P P indicate the cams for retracting the needles after they have been thrust forward by the action of the pattern-cards, the same being constructed of a general triangular form in plan view. (See Fig. 1.) These cams are operated as follows: In the lug rising from the top of each cam is a vertical slot $p$, through which passes a pin $p'$, carried by the lower end of the cam-carrier $P'$, that is secured to the slide-bar $P^2$. The pin-and-slot connection allows the cam to be lifted when its needle-bar is raised and to rock or tilt in accordance therewith; but since the lower end of the carrier-arm is bifurcated and the lug of the cam fits in the bifurcation a motion of the slide-rod longitudinally positively operates or carries the cam in both directions with it.

The two bars $P^2$ slide freely at their outer ends through ways formed in stands $p^2$, rising from the base-plate, and at their inner ends are connected together by a cross-bar $P^3$, to the center of which is secured one end of the operating-rod $P^4$, having a cross-head $P^5$ at its outer end, said cross head being bored at its ends to receive the way-rods $p^3$, secured to studs rising from the base-plate. Thus the slide-bars, cross-bar, operating-rod, and cross-head are guided, when reciprocated, by the stands $p^2$ and rods $p^3$. To reciprocate these parts, a wrist-pin $c$ is provided with a slide $c'$ and is carried by a slotted plate $c^2$, adjustably secured by a screw $c^4$ in a radial groove $c^3$ of the gear C, and said slide-block $c'$ enters and fits a groove formed in the under side of cross-head $P^5$. Thus the cams P P are caused to reciprocate and operate against the inner side of the butts $d^3$ to retract the needles successively by the rotation of gear-wheel C through the parts just described, and the length of such reciprocations may be adjusted by varying the setting of the radially-adjustable plate $c^2$.

Proceeding now to describe the yarn-guides and the means by which I may automatically and through the instrumentality of a pattern-chain control the knitting-in of different colored yarns, and referring to Figs. 6, 7, 8, 15, 16, and 17, R represents a guide-bar mounted upon suitable stands $r$, secured on the base-plate and provided with ways $r'$ to fit the dovetailed grooves of the yarn-guides S S', each of which consists of a piece of sheet metal having a tube $s$ at its lower end, a guide-hole $s'$ for the yarn near its upper end and through which the yarn should be passed before threading through the tube, and two slots in its intermediate portion, through which screws $s^2$ pass into the slide-blocks $s^3$, which slide on the way $r'$ and by means of which slots and screws $s^2$ the height of the yarn-tubes may be adjusted.

The block $s^3$ of yarn-guide S is provided with an upwardly-projecting inturned plate $s^4$, having a downwardly-projecting pin $s^5$ in its upper end and with an inwardly-projecting pin $s^6$ under the bar R, while the block $s^3$ of guide S' is provided with an upwardly-projecting pin $s^7$ and with an inwardly-projecting pin $s^6$, similar to that carried by the other guide, but located relatively higher. A comparison of Figs. 7 and 17 will illustrate this difference in elevation of the pins $s^6$, these two views being in opposite directions, on a line which necessitates showing of but one guide, and one showing guide S' on the line of the section, the other showing guide S beyond the line of section.

Q represents a rod vertically movable in guides formed in the base-plate and in a bracket of the outer stand $r$, said rod being normally pressed downward by a spring $q$, coiled around it and confined between said bracket and a pin passed through the rod. At its lower end this rod is provided with a rounded foot and at its upper end is secured a laterally-projecting arm $q'$, having two hangers $q^2 q^2$ extending down past bar R and united under said bar by two cross-pins $q^3$. From the arm $q'$ a plate $q^4$ extends in the direction of bar R, and is provided with a hole $q^5$ and a hole $q^6$, adapted, respectively, to engage the pin $s^5$ of yarn-guide S and the pin $s^7$ of yarn-guide S' at the times and when operated as hereinafter described, and consequently to hold either of said yarn-guides against being drawn away, according as the rod Q may be lifted and guide S restrained or lowered and guide S' restrained.

To cause the vertical reciprocation of rod Q and the consequent holding of one yarn-guide while the other is operated to lay the yarn in the needle-hooks, I employ a pattern-chain Q', similar to the pattern-chain E, and operated by means of a drum $q^7$, mounted in suitable hangers under the base-plate and having a ratchet $q^8$. A pawl $q^9$, engaging said ratchet, is pivoted to an arm $q^{10}$, guided upon the shaft of the drum by means of a slot $q^{11}$, through which said shaft passes, and being pivoted at its other end to one of the arms of the Jacquard prisms. The cams $q^{12}$ of the pattern-chain Q' operate against the under side of the foot of rod Q and lift it, the spring serving to return it. Of course the arm $q^{10}$ will be connected to the arm L of that Jacquard mechanism that will ordinarily be employed whether knitting a flat web or a tubular fabric.

The inner end of rod $P^4$ is provided with a hole $u$, drilled longitudinally therein, (see Fig. 4,) and the top of the cross-bar $P^3$, which receives and is secured to said rod, is provided with a groove $u'$ parallel with said hole. In this hole and groove $u$ and $u'$, respectively, fit guide-pins $u^2$, connected by a head-plate $u^3$, the upper portion of the upper pin $u^2$ projecting above the top of the groove $u'$, and receiving the pressure of a friction-spring $u^4$, (see Figs. 1, 4, 6, 7, 8, 15, and 16,) the object of which will presently be explained.

To the head-plate $u^3$ is pivoted the pointed tongue-catch U, having notches or recesses $u^5$ and $u^6$, respectively, in its upper and lower edges and having a bell-crank-lever latch $u^7$ pivoted to its side and a stop-pin $u^8$ arranged back of the lower arm of such latch-lever to limit its movement in that direction. The point of this latch-lever is turned up slightly to form a cam-surface, as indicated at $u^9$, and its lower arm or heel is connected to an extension $u^{10}$ from the head-plate by a spring $u^{11}$, said spring serving to normally hold the latch against the stop-pin in the position shown in Fig. 16 and acting, also, to draw the latch and the tongue-catch U downward at times, as shown in Fig. 15. It will be seen that the lower guide-pin $u^2$ projects beyond the head-plate $u^3$ and under the tongue-catch, by which a stop is formed to prevent the drawing of said catch by spring $u^{11}$ downward below a substantially horizontal plane, as shown in Fig. 15.

On the guide-bar R are two stops $r^2$ $r^3$, adjustably secured thereto and against which the yarn-guides abut at the end of reciprocation. The outer stop $r^2$ will ordinarily be adjusted to about the position shown, while the inner one $r^3$ may be placed at the proper distance therefrom.

Before proceeding with the description of the construction of other parts the operation of the yarn-guides and the means whereby either of them may be caused to lay its yarn in the hooks of the needles before the cams P commence to retract them should be understood. The operation of the pattern-chain Q' is so timed that a change in the vertical height of the rod Q, hangers $q^2$, their pins $q^3$, and the plate $q^4$ occurs at the time when the operating-rod $P^4$ has advanced either of the yarn-guides to its outermost position or against stop $r^2$, and when said guide is in position to be engaged and held by plate $q^4$ and the one previously held released. With the parts in the position shown in Fig. 15 the yarn-guide S' has its pin $s^7$ engaged by the hole $q^6$ of the retaining-plate $q^4$, and as long as said plate is in its lower position said yarn-guide is held in that non-operative position; but the guide S has its side pin $s^6$ engaged by the lower notch $u^6$ of the tongue-catch, and is therefore reciprocated by it. As shown in said Fig. 15, the guide S has reached the stop $r^3$, while the cross-bar $P^3$ has been moved to its extreme inward position, carrying the cams to such a position that on the outward stroke of the rod $P^4$ the head-plate $u^3$ will be retained in its advanced position relatively to the cross-bar $P^3$, owing to the friction of the spring $u^4$ on the upper guide-pin $u^2$, and consequently the said yarn-guide S in its advance will lay the yarn in the hooks of the needles before the cams P commence to retract them. When the guide S reaches the stop $r^2$, the cross-bar $P^3$ and the cams P continue to advance to their extreme limit and the guide-pins $u^2$ $u^2$ will be pushed back in the hole $u$ and groove $u'$, and on the return movement of rod $P^4$ the said yarn-guide again travels in advance of the cams P, owing to the friction of the spring $u^4$, until it reaches the stop $r^3$, when the continued movement of rod $P^4$ brings the parts again to the position shown in said Fig. 15. When desired, a cam of the pattern-chain Q' will act to raise the rod Q to its extreme height at the moment when the catch U is in its forward position and its yarn-guide against the stop $r^2$, and the result will be that the lower cross-pin $q^8$ of the hangers $q^2$ will strike the lower edge of the catch U and tilt it upward, releasing the notch $u^6$ from the lateral pins $s^6$ of the guide S and causing the lateral pin $s^6$ of the guide S' to ride into the notch $u^5$ under the cam-point $u^9$ of the latch $u^7$ and be retained therein by the action of the spring $u^{11}$, which then causes the latch to act as a lever, of which the pin $s^6$ is the fulcrum, and keep the catch elevated by the lifting action at the point where the latch is pivoted to said catch. Simultaneously with this action of the catch, releasing one yarn-guide and taking the other, the rise of the plate $q^4$ releases the pin $s^7$ of the yarn-guide S' from the hole $q^6$ in the retaining-plate and causes the hole $q^5$ of said plate to receive the pin $s^5$ of the plate $s^4$ of the yarn-guide S, thus restraining the latter from movement along bar R and allowing the guide S' to be operated in the same manner as above described regarding guide S, all as indicated in Fig. 16. When the next reversal or substitution of yarn guides is to occur, the omission of a cam from the pattern-chain at the proper place permits the downward movement of rod Q at the proper time to cause the retention of guide S' and the engagement of guide S. The lowering of the retaining-plate frees one and engages the other by the reverse of the operation above described, while the engagement of the upper cross-pin $q^8$ with the top of the catch U depresses the latter and causes its lower notch $u^6$ to engage the pin $s^6$ of the guide S, as shown in Fig. 15, and to lower the upper notch $u^5$ below the plane of the pin $s^6$ of guide S', the spring $u^{11}$ permitting the latch to move for this purpose. As soon then as the rod $P^4$ begins its inward movement the point $u^9$ slips off from pin $s^6$ of guide S', and the parts are all then in the position shown in Fig. 15.

By means of the two yarn-guides and the mechanism for operating and controlling them I am enabled by the simple use of different arrangements of the cams of a pattern-chain to knit any arrangements of courses or stripes in the fabric that may be desired.

T T indicate the latch-openers, which are constructed in the form of plates. These openers are secured by screws or otherwise to the upper sides of the bars $t t$, which retain the needles in their bars and are arranged in such relation to the needles as to enter between their hooks and latches when said needles are advanced and prevent such latches from closing down upon the hooks before the latter have taken the yarn.

I will now describe the holding-down hooks and the mechanism whereby both rows of hooks will respectively operate when both needle-bars are in use and but one row of hooks will operate when but one needle-bar is used. V V represent the hook-bars, each having a row of hooks $v$, permanently secured, as by soldering, to the front of edge of the bar, with the hooks of each bar so arranged that their points extend inward toward the hooks of the other bar, as shown in Fig. 8, whereby their rounded tops when they are raised will ride against the rounded or cam-shaped edges $d^5$ of the needle-bars, and thereby insure the maintenance of such hooks in proper position to engage the edge of the fabric as they move downward in their descending movement. To cause the points of the hooks to keep in engagement with said cam-edge and yield therefrom when required, each hook-bar is loosely secured to arms $v'$ from a rock-shaft $v^2$, having suitable bearings in lugs $v^3$ of the base-plate A, the said bar having lugs $v^4$ secured in the bifurcated ends of the arms $v'$ by pivot-pins, and a leaf-spring $v^5$ (see Fig. 2) being secured to one of said arms $v'$ and extending under the bar to keep the bar and its hooks in said engagement. An arm $v^6$, projecting from the rock-shaft intermediate of its arm $v'$, (see Figs. 2 and 8,) has a hole at its end, through which passes a pin $v^7$, projecting down from the base-plate A, the relative size of the hole and the pin in cross-section being such as to permit the arm $v^6$ to have the slight necessary movement in the arc of a circle without binding on this pin. Set-nuts $v^8$ on the pin limit the downward movement of the arm and the hook-bar, while a spring $v^9$ presses said arm and hook-bar downward against the set-nuts and serves to return the bar after it has been lifted by the cam-bar presently described. To the inner end of each rock-shaft is secured an arm or crank $v^{10}$, (see Figs. 2 and 9,) having a pin at its other end flattened on its under side where it rests on the sliding cam-bar K, as shown in Figs. 2, 4, 7, 8, and 9 to 14, inclusive. The two crank-pins, for purposes of clearness of description of operation, I designate by separate reference-letters $h$ and $h'$. The cam-bar K has a slot at each end, through which pass pins or screws $l\ l'$, whereby the bar is secured upon the two inner arms $L\ L'$ of the Jacquard prisms, and may be partially operated thereby, as hereinafter described, and said cam-bar, about midway of its length, has its upper edge recessed, whereby two inclines $k$ and $k'$ are formed, which inclines act as cam-surfaces, by which the pins $h\ h'$, and consequently the hook-bars, are lifted.

To reciprocate the cam-bar K to its full extent when both Jacquard mechanisms are oscillating in turn and to reciprocate said bar so as to operate but one crank-pin and hook-bar when only one Jacquard mechanism is oscillated, I have devised the following mechanism: On the face of the cam $g^4$, that is carried at the end of main shaft B, are secured two pins $x\ x'$, and on the side of the bar K toward said cam are secured cam-lugs $y,\ y'$, $y^2$, and $y^3$, of the shape shown in Figs. 9 to 14, and of which the lug $y'$ is fixed to the face of the lug $y$ and lug $y^2$ is intermediate of these and the lug $y^3$. The pin $x$ is short, being of such length that the lug $y'$ is the only one that can be engaged by it, and the pin $x'$ is of course of such length that it will freely pass the side of the bar K. The crank-pins $h\ h'$, while resting upon the bar K, do not extend over the same, and are therefore out of position to be operated by anything but the said sliding bar K and its inclines $k\ k'$. The operation of this group of mechanisms is as follows: With the parts in the position shown in Figs. 9 and 10, the driving-shaft and its cam $g^4$ rotating in the direction of the arrow and the connection and timing of the entire machine such that the Jacquard mechanism is operating to advance the needles, which would appear at the right if shown in said figures, the pin $l'$ will strike the inner end of its slot in the bar K and move the latter along so as to raise the pin $h'$ to the position shown in Fig. 11. This motion of bar K will bring the cam $y'$ to such position that its inner incline will be engaged by the pin $x$, and the bar thereby moved along to the position shown in full lines in Fig. 12, and the crank-pin $h'$ and its hook-bar lifted to the full extent. The pin $h'$ remains in this position until the pin $x'$ engages the lug $y^3$, forcing the bar K back to the position shown in Fig. 10, when the hook-bar will descend and the hooks draw down the fabric and hold the same until again elevated, and so on. If now the Jacquard mechanism on the left is not oscillating in turn, the above-described movements are repeated by the next rotation of the cam $g^4$ and its pins, and consequently the pin $h$ and the hooks on that side are not operated, but if both jacquards are in operation in turn then when the parts have reached the position shown in Fig. 10, after the movements described, the advance of arm L on the left causes its pin $l$ to move the bar K to the right, which first slightly lifts the pin $h$ up the incline K, as shown in Fig. 13, and at the same time brings the outer incline of the cam-lug $y'$ into position to be engaged by the cam-pin $x$, which, moving down said incline, causes the bar K to be moved to its full extent to the right and through the pin $h$ lifts the hook-bar to which the pin $h$ is secured, as shown in full lines in Fig. 14. The return from this position is caused by the engagement of pin $x'$ with the under right-hand incline of the lug $y^2$ in passing again to the position shown in Fig 10, at which time the parts are ready for the repetition of the operation first described. It is to be understood, of course, that the cam $g^4$, with its face-pins $x\ x'$, makes two revolutions during the complete oscillation of both Jacquard mechanisms, and the rising and falling movements of the hook-bars with respect to the needles are such that immediately upon the forward movement of the needles the hook-bars are raised to their highest position and there held until the yarn has been supplied to the needles and the latter retracted, when the hooks descend, engaging the edge of the fabric and carrying it downward to their lowest position, where they remain until the needles are again advanced and the operations repeated, and so on.

At $z$ in Figs. 1, 2, and 3 are shown bracket-lugs, to which is secured the semicircular stand Z for supporting the bobbin-spindles and tension devices.

The operation of the machine in general without repeating the description of the operation of details already given is as follows:

Yarn being supplied to the yarn guides or carriers, the cams on the pattern-chain E being arranged, the requisite pattern-cards being supplied to the Jacquard prisms, and the machine started, the needle-bars will be raised by the action of said cams, a yarn-guide carried back and forth across the needles through the medium of the operating-rod $P^4$, and the needles in the needle-bars, as the latter are raised, will be advanced by the action of the Jacquard mechanism to take the yarn, their retraction to draw the yarn thus taken through the loops already on their shanks being effected by the action of the cams P P as they are reciprocated back and forth with the yarn-guide. The several operations thus mentioned result in the interlooping of the yarn and the production of a knitted fabric, and as fast as it is formed it is taken up by the action of the hooks without the employment of any weights. If the arrangement of the cams of the pattern-chain E be such as to cause the alternate raising of the needle-bars, a tubular fabric will be formed, the yarn being carried up on one side and interlooped by the needles of the bar on that side, thence across at the end and down on the other side, where it is interlooped with the needles of the other bar, thence across and up on the first side, and so on, such operation continuing as long as it may be desired to knit a tubular fabric. If, on the other hand, the cams on the pattern-chain be so disposed that each of the needle-bars will be elevated twice in succession and then depressed while the other is elevated the same number of times, and so on in like alternation, a flat fabric or web of the width of both rows of needles will be produced, the yarn supplied by the yarn-guides being carried up and interlooped with, say, the needles of the front row, thence across to the needles of the back row, and down and up over such needles and interlooped by them at each movement of said yarn-guides, thence back to the front row of needles at the point where it formerly crossed from the front to the back rows of needles, and thence down and up the front row and similarly interlooped by said needles at both of such movements, and thence over across to the back row of needles at the point of its former crossing, and so on throughout the entire fabric. Should, however, a fabric of this width be not required, the cams on the pattern-chain may be so arranged as to elevate only one of the needle-bars, in which event the yarn will be interlooped by the needles carried thereby during the movement of the yarn-guides in both directions and a flat fabric of the width of one row of needles or less produced, as may be desired. To effect the widening or narrowing of the fabric, the needles are brought into or thrown out of operation automatically by the action of the Jacquard mechanism, the pattern-cards thereof being so perforated as to admit of the desired number of needles being brought into or carried out of operation at each reciprocation of a yarn-guide.

From the above it will be seen that I produce a machine which is not only simple in construction, but one which is at the same time adapted to the production of either flat or tubular fashioned articles and with any predetermined arrangement of stripes or courses automatically. By arranging the needle-bars so as to render them capable of a swinging movement and by raising the inner or front edge of each of them when its needles are to be reciprocated to permit of their passing above the other bar I am enabled to bring the needle-bars into closer relation with each other than has generally been possible with machines of this class, thus obviating to a great extent the straining of the yarn and the consequent evil effects due to the carrying across of the yarn from one row of needles to the other, as is required in the operation of knitting tubular fabrics. Furthermore, by the construction of parts set forth I am enabled to produce tuckwork and various other forms of ornamentation with great facility, the governing of the movements by the Jacquard mechanism admitting of an almost endless variety therein.

Having thus described my invention, what I claim, and desire to secure by Letters Patent of the United States, is—

1. In a knitting-machine, the combination, with needle-bars and pattern mechanism for raising the same and lost-motion devices interposed between said mechanism and needle-bars, of Jacquard mechanism for advancing the needles, oscillating sleeves, levers operated by the said pattern mechanism, and means operated by said levers for connecting and disconnecting the Jacquard mechanism to and from their respective sleeves, substantially as described.

2. In a knitting-machine, the combination, with needle-bars arranged in substantially the same plane, of levers connected thereto, pattern mechanism for operating said levers, a lug having an inclined top carried by each of said levers, sliding levers resting at one end upon said lugs, Jacquard mechanism for advancing the needles, and mechanism operated by the sliding levers for bringing into or throwing out of operation the said Jacquard mechanism, substantially as described.

3. In a knitting-machine, the combination, with the needle-bars and pattern mechanism for raising the needle-bars in predetermined order, of a drum and ratchet for operating said mechanism, the sliding bar $G^3$, having pawl $G'$ and having the inclined slot $G^6$, into which a fixed pin projects, and mechanism for operating said bar, substantially as described.

4. The combination, with the carrier-arms $P'$ and mechanism for reciprocating them, of cams hinged to said arms and vertically movable in relation thereto, the needles, the needle-bars, and mechanism for raising the inner edges of said needle-bars, substantially as described.

5. The combination, with the carrier-arms P', of the cams P, having lugs provided with vertical slots $p$, the said carrier-arms having pins $p'$ entering said slots, the needles, their needle-bars, and mechanism for raising said bars, substantially as described.

6. The combination, with the cams P and their sliding bars $P^2$, of the cross-bars $P^3$, the operating-rod $P^4$, secured thereto at one end and having cross-head $P^5$ at its other end, way-rods $p^3$ for the cross-head, and means for operating said cross-head, substantially as described.

7. The combination, with the rod $P^4$, having the hole $u$, and the cross-bar $P^3$, having groove $u'$, of the head-plate $u^3$, having guide-pins $u^2$, and the friction-spring $u^4$, carried by cross-bar $P^3$ and resting on the upper guide-pin, substantially as described.

8. The combination, with the two yarn-guides having pins $s^6$, of the tongue-catch U, pivoted to a reciprocating carrier and having notches $u^5$ and $u^6$ in its upper and lower edges, respectively, and means for positively restraining the movements of the yarn-guides when not engaged by the pivoted tongue-catch, substantially as described.

9. The combination, with the two yarn-guides having pins $s^6$, of the tongue-catch U, pivoted to a reciprocating carrier and having notches $u^5$ and $u^6$ and stop-pin $u^8$, and the spring-held latch $u^7$, pivoted to catch U and having a point at one end extending beyond the notch $u^5$, substantially as described.

10. The combination, with two yarn-guides, a catch for engaging with either of them, and means whereby the catch may be reciprocated, of pattern devices for automatically raising and lowering the catch and locking the yarn-guide not engaged with such catch in one of its extremes of movement and positively holding it in that position, substantially as described.

11. The combination, with the two yarn-guides, one having an upwardly-projecting pin and the other a downwardly-projecting pin, of the vertically-movable plate $q^4$, having holes $q^5$ $q^6$, pattern mechanism for automatically moving said plate, and means for reciprocating either of said guides, substantially as described.

12. The combination, with the two yarn-guides having pins $s^6$, of the reciprocating hinged tongue-catch U, having notches $u^5$ $u^6$, the vertically-movable rod Q, the cross-pins $q^3$, supported and operated by the rod Q, and means for operating said rod, substantially as described.

13. The combination, with the guide-bar R, having ways $r'$ and with the yarn-guides S S' fitted to said ways, the needles $d'$, and the needle-operating cams, of mechanism for moving said yarn-guides along the ways, having an extensible portion, and adjustable stops secured to said ways, against which the yarn-guides abut and are positively held to bring them into proper relation with respect to the cams to insure the laying of the yarn in the hooks of the needles on the return stroke of the appropriate guide before the needles are withdrawn, substantially as described.

14. In a knitting-machine, the combination, with two needle-bars and their needles arranged in substantially the same plane, of mechanism for reciprocating the needles of one or both of the needle-bars, a vertically-movable hook-bar under each needle-bar and having hooks adapted to engage the fabric knitted by the needles, and mechanism for moving one or both of the hook-bars in unison with its or their respective row or rows of needles and retiring it or them from action when its or their respective row or rows of needles are retired therefrom, substantially as described.

15. The combination, with the hook-bar V and a rock-shaft having arms to which the hook-bar is hinged, of a spring $v^5$, secured to the under side of one arm and extending under the said bar, substantially as described.

16. The combination, with the shaft $v^2$, hinged hook-bars V, having arms $v^6$, provided with holes, and the pins $v^7$, passing through said holes, of the spring $v^9$, coiled around said pins above the said hook-bars, substantially as described.

17. The combination, with the swinging hook-bars having crank-pins $h$ $h'$, of the sliding bar K, having inclines $k$ $k'$, and means for operating said bar, substantially as described.

18. The combination, with the swinging hook-bars having crank-pins $h$ $h'$, of the oscillating arms L L', having pins $l$ $l'$, the bar K, provided with slots through which said pins pass and provided, also, with inclines $k k'$ and with cam-surfaces, the shaft B, the disk $g^4$, and the pins $x$ $x'$, carried by such disk, substantially as described.

19. The combination, with the hook-bars having crank-pins $h$ $h'$, of the sliding bar K, provided with inclines $k k'$ and provided with a plurality of cams on its side, one of said cams being in a different lateral plane from the others, a rotary disk having two pins for engaging the different cams, one of said pins being longer than the other, substantially as described.

20. The combination, with the hook-bars having crank-pins $h$ $h'$, of the sliding bar K, having inclines $k k'$ and provided with the cams $y$, $y'$, $y^2$, and $y^3$ on its side, and the rotary disk $g^4$, having pins $x$ $x'$, substantially as described.

In testimony whereof I have hereunto set my hand this 9th day of December, 1890.

CHARLES JAMES APPLETON.

Witnesses:
ROBERT WATERBURY,
WM. H. APPLETON.